US006829706B2

(12) United States Patent
Ihle et al.

(10) Patent No.: US 6,829,706 B2
(45) Date of Patent: Dec. 7, 2004

(54) DEVICE CONTAINING A FUNCTIONAL UNIT THAT STORES FUNCTION DATA REPRESENTATIVE OF ITS PROPERTIES AND A DATA PROCESSING PROGRAM FOR OPERATING WITH REQUIRED FUNCTION DATA

(75) Inventors: Rainer Ihle, Bammental (DE); Gerhard Schlindwein, Graben-Neudorf (DE); Detlef Strunk, Heidelberg (DE); Jan Tusch, Heidelberg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 658 days.

(21) Appl. No.: 09/811,797

(22) Filed: Mar. 19, 2001

(65) Prior Publication Data

US 2001/0027497 A1 Oct. 4, 2001

(30) Foreign Application Priority Data

Mar. 17, 2000 (DE) .......................................... 100 13 455

(51) Int. Cl.⁷ ............................................. G06F 15/177
(52) U.S. Cl. ........................................... 713/1; 711/170
(58) Field of Search ........................ 713/1, 2; 711/170; 710/14

(56) References Cited

U.S. PATENT DOCUMENTS

| 5,155,837 A | | 10/1992 | Liu et al. |
| 5,212,789 A | | 5/1993 | Rago |
| 5,321,839 A | * | 6/1994 | Murakami et al. .......... 711/170 |
| 5,363,446 A | | 11/1994 | Ruppertz et al. |
| 5,940,627 A | * | 8/1999 | Luciani et al. ................ 710/14 |
| 5,974,429 A | | 10/1999 | Strub et al. |
| 6,014,714 A | | 1/2000 | Plyler et al. |

FOREIGN PATENT DOCUMENTS

| DE | 295 13 217 U1 | 3/1996 |
| EP | 0 961 122 A1 | 12/1999 |
| GB | 2 264 575 A | 9/1993 |
| WO | WO 94/01819 | 1/1994 |

* cited by examiner

Primary Examiner—Thomas Lee
Assistant Examiner—P Chandrasekhar
(74) Attorney, Agent, or Firm—Laurence A. Greenberg; Werner H. Stemer; Gregory L. Mayback

(57) ABSTRACT

A device for recognizing functional units in an electrical system, which is one of being optional and provided in different construction stages, respectively, comprising a data processing unit and at least one functional unit, the functional unit having a function register with a nonvolatile memory for holding function data, the memory having at least one function entry with function data associated with the physical properties of the functional unit, a change in the properties of the functional unit being recordable by changing the corresponding function data of the function entry in the function register; and a method of operating the device.

12 Claims, 4 Drawing Sheets

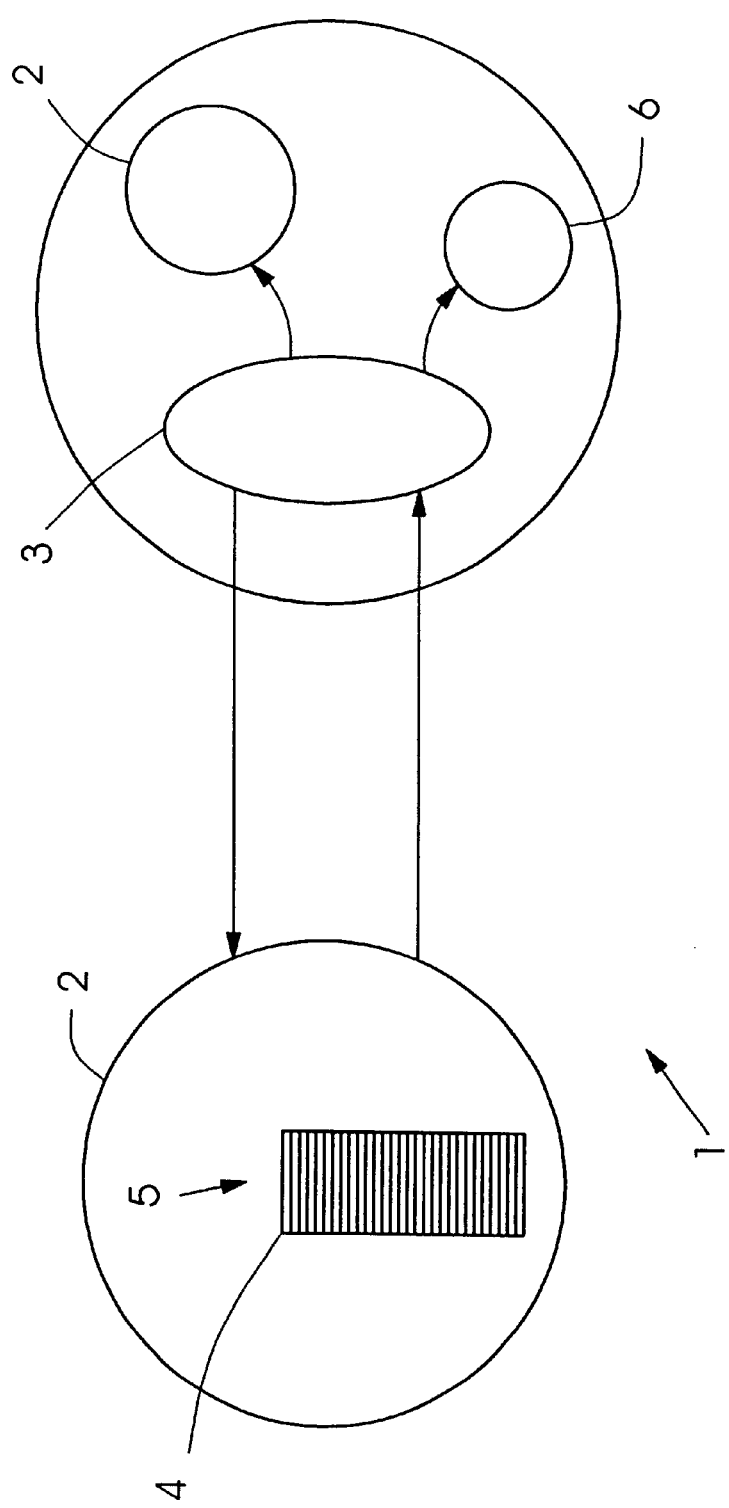

| Address | Value | Description (0x... = hexadecimal) |
|---|---|---|
| 0 | 1000 | Number of bytes over everything (e.g. 1000 = 1000 bytes) (16 bit word little endian) |
| 2 | 404-004=400 | 400 number of bytes in 1st group (400 = 400 bytes) (16 bit word little endian) |
| 4 | 1024 | Number of 1st group used (1024 = BL motor) (16 bit word little endian) |
| 6 | 108-008=100 | Number of bytes in 1st subgroup (100 = 100 bytes) (16 bit word little endian) for group 1024 |
| 8 | 1 | Number of first subgroup 1 used (phys. data) (16 bit word little endian) |
| 10 | 0x01 | CTR byte of first parameter of subgroup 1 (0x01=byte) |
| 11 | 0x25 | Value of first parameter of subgroup 1 (e.g. 37 ohms) |
| 12 | 0x03 | (CTR byte of 2nd parameter of subgroup 1 (0x03=dword) |
| 13 | 0x21 | 2nd parameter of subgroup 1 (e.g. 0x87654321) |
| 14 | 0x43 | (little endian) |
| 15 | 0x65 | |
| 16 | 0x87 | |
| 17 | 0x9A | CTR byte of 3rd parameter of subgroup 1 bytestream 26 bytes 3rd parameter of subgroup 1 (bytestream) |
| ... | ... | ... |
| 106 | xyz | |
| 108 | 2 | Number of bytes in 2nd subgroup for group 1024 (16 bit word little endian) |
| 110 | 0x1 | Number of 2nd subgroup used = 2 = rated values (16 bit word little endian) |
| 111 | 0x25 | CTR byte of 1st parameter of subgroup 2 1st parameter of subgroup 2, CTR byte of 2nd parameter of subgroup 2 |
| ... | ... | 2nd parameter of subgroup 2 ... |
| 402 | xyz | |
| 404 | 512 | Number of bytes in 2nd group (16 bit word little endian) |
| 406 | | Number of 2nd group used (512=increment sensor) (16 bit word little endian) Number of bytes in 1st subgroup for group 512 Number of 1st subgroup used = 2 = rated values CTR byte of 1st parameter of subgroup 2 |
| ... | ... | 1st parameter of subgroup 2 ... |
| 999 | 0xWXYZ | |
| 1000 | Empty | CRC check: CRC-CCITT generator (x16+x12+x5+1) (gives 16 bit checkword "big endian") 0x00           filler bytes = 0x00 |

FIG. 2

| Bit 0 | 0 | not compatible for EWM2 |
|---|---|---|
| | 1 | compatible for EWM2 |
| Bit 1 | 0 | no differential inputs |
| | 1 | 4 differential inputs (X6/1..8) at LOWER nibble IO-IC 7 |
| Bit 3.2 | | equipment variant ser. interface 3 (X8) |
| | 00 | CPD/KID |
| | 01 | SVM-Master |
| | 10 | MID |
| | 11 | not defined |
| Bit 4 | 0 | not defined |
| | 1 | not defined |
| Bit 5 | 0 | not defined |
| | 1 | not defined |
| Bit 6 | 0 | not defined |
| | 1 | not defined |
| Bit 7 | 0 | not defined |
| | 1 | not defined |

Fig. 4

DEVICE CONTAINING A FUNCTIONAL UNIT THAT STORES FUNCTION DATA REPRESENTATIVE OF ITS PROPERTIES AND A DATA PROCESSING PROGRAM FOR OPERATING WITH REQUIRED FUNCTION DATA

BACKGROUND OF THE INVENTION

Field of the Invention

The invention relates to a device for recognizing functional units in an electrical system provided in preferably optional or different construction stages, the device having a data processing unit or CPU and at least one functional unit, the functional unit having a function register with a nonvolatile memory for holding function data. The invention also relates to a method for recognizing a functional unit by using this device.

Devices of this type are employed for allowing data interchange between the functional units of the electrical system, which are required for operation, and the data processing programs executed by the CPU. The functional units, in essence, include the electronic elements of the component parts, such as data lines, interfaces, memories, input/output units, ports and also control elements and the like.

So that the functional units in the electrical system are recognizable amongst one another and by the CPU, it is necessary for all the function data for the properties of each functional unit to be known and to be available in readable form for the electrical system and the CPU. If a data processing program is executed by a data processing unit or CPU and, in this context, executes instructions which require the functional unit to be accessed, this is only possible if the format of the function data is known during data communication. If the format of the data available for the functional unit is understood by the data processing program or by other functional units which are involved, then there is compatibility between these components. Because the CPU is not readily able to recognize whether the formats are compatible during data communication, when the data processing program is being executed, there is a risk that incompatible data will be processed together and that the components involved will be misinterpreted and will malfunction.

Besides the elements of the component parts, virtual devices of the electrical system, such as drivers for data processing programs and the like, may also be considered as functional units.

An electrical system generally includes a large number of functional units. In addition, the electrical system also includes the data processing programs which address and control the functional units for operating the electrical system via the CPU. The electrical systems are produced basically equipped with functional units and data processing programs and are matched to the requirements of the respective intended uses. In this context, individual functional units and data processing programs are retrofitted, i.e., installed afterwards, or are interchanged. The electrical systems are frequently produced in different disassembly stages and can have further functional units added thereto at a later time. In this regard, it is possible to assemble disassembly stages according to the required functional scope of the system. With this type of construction of the electrical system, individual functional units or groups of functional units are connected together and are controlled by one or more data processing units using data processing programs.

Because, in such electrical systems, functional units are interchanged, added to, removed or replaced, these new functional units must always be recognizable and compatible for the system. This is of particular importance for the data processing programs which communicate with the functional units in the electrical system, because these programs control the system based upon the compatibility of the functional units.

To make the functional units recognizable for the system, German Patent 295 13 317 proposes a device for automatically recognizing functional units in an electrical system provided on an optional basis or in different disassembly stages. The electrical system includes a data processing unit which has at least one functional unit. This functional unit is used as a standardized plug-in point for all types of functional units. Each of these functional units has a unique coding for identifying it. For each functional unit, there is at least one shift register provided for holding the coding associated with this functional unit. Each functional unit is equipped with a connection for outputting the coding thereof in serial form. The data processing unit has equipment for driving the shift register of a functional unit and for reading out in serial form the coding contained therein. A disadvantage of this heretoforeknown device is that, when properties of a functional unit have changed or been extended, the coding is kept unchanged, because the functional unit itself is not being replaced. Accordingly, the software needs to be changed so that the changes in the functional unit can continue to be used by the old data processing programs. Because each functional unit has a unique coding, data processing programs which were able to address the functional unit before a change are no longer able to interchange data after a change, without any updating, due to the fact that the programs cannot identify the changed properties. Furthermore, installation of new programs also necessitates that all the codings for the existing functional units be observed. This means that, without a list of all the old codings, a new program is not able to identify old functional units. If, on the other hand, a functional unit is changed, as described hereinabove, and the coding is also changed at the same time, data processing programs which were able to address the functional unit before a change are no longer able to do so if they are not updated with the new coding.

Particularly when parts for electrical systems need to be replaced after a relatively long time, it becomes apparent that, despite the fact that the data processing programs which access them are compatible, the new functional units can no longer be addressed because the new codings thereof are not known in the old data processing programs. On the other hand, problems also arise if functional units are changed and the old codings thereof are kept unchanged. The current data processing programs in the electrical system then identify the compatible functional units as being the original ones, and the new properties of the changed functional units no longer conform with the old properties. This frequently causes operating faults which result in a stalling of the system or in the occurrence of errors during operation.

The same disadvantages arise when one functional unit is supposed to be used or exchanged in different applications, i.e., in various electrical systems. The data processing programs in one system do not then recognize the functional units in the other system, because codings are not interchangeable.

These problems can generally be solved by appropriately updating the respective data processing programs containing the respective function data linked to the respective coding. However, each time the function data of the system are changed or extended, this requires a considerable level of programming effort, complex data maintenance and corresponding down times for the installation operated by the electrical system while updating is being performed.

In the course of the development cycles for data processing programs and functional units, various combinations of old and new versions of data processing programs and functional units may arise. Thus, by way of example, a newly produced data processing program should recognize all the development stages of a functional unit and should match the system accordingly, in order to prevent malfunctions. Similarly, old versions of data processing programs should be able to work with new compatible versions of functional units. To this end, clear recognition of the properties of the functional units must be assured.

SUMMARY OF THE INVENTION

It is therefore an object of the invention to provide a device for recognizing functional units with which the aforementioned disadvantages are avoided and which ensures reliable and readily realizable recognition of functional units, in particular of the functional units of electronic elements of component parts or the hardware components in the electronic installation. It is also an object of the invention to provide a method for recognizing functional units.

With the foregoing and other objects in view, there is provided, in accordance with one aspect of the invention, a device for recognizing functional units in an electrical system, which is one of being optional and provided in different construction stages, respectively, comprising a data processing unit and at least one functional unit, the functional unit having a function register with a nonvolatile memory for holding function data, the memory having at least one function entry with function data associated with the physical properties of the functional unit, a change in the properties of the functional unit being recordable by changing the corresponding function data of the function entry in the function register.

In accordance with another feature of the invention, each function entry in the function register is changeable by at least one step of erasing, overwriting and adding to, respectively, at least an individual set of function data.

In accordance with a further feature of the invention, data processing programs for operating the functional unit have access data corresponding to the function data.

In accordance with an added feature of the invention, function registers of various functional units in the electrical system are connected to one another via the data processing unit, and compatibility of a functional unit with at least one of another functional unit and a data processing program, respectively, is checkable by comparing at least one set of the corresponding function data and access data.

In accordance with an additional feature of the invention, the function register has a collective function entry with which function data for properties of the functional unit are associated for which there is no association in the function entries.

In accordance with yet another feature of the invention, the function register has at least one mechanically operated and electronic, respectively, read/write memory for storing the function data.

In accordance with yet a further feature of the invention, the memory is selected from the group consisting of a DIP switch, a solder bridge, a jumper and an electronic memory chip.

In accordance with yet an added feature of the invention, the electrical system includes functional units in a module of a printing machine.

In accordance with yet an additional feature of the invention, the functional units in the module of the printing machine include a plurality of units selected from the group consisting of input/output units, actuators, interfaces as well as memory and data processing units of a driving motor.

In accordance with another aspect of the invention, there is provided a method for recognizing a functional unit in an electrical system, which is one of being optional and provided in different construction stages, respectively, which comprises storing each property of the functional unit in a read/write memory by at least one of a function entry and a collective function entry associated with the respective property, and changing the function entry by at least one of replacing, adding to and erasing at least an individual function data in the read/write memory.

In accordance with a further aspect of the invention, there is provided a method for recognizing a functional unit in an electronic system, which is one of being optional and provided in different construction stages, respectively, which comprises, during operation of the electronic system with a data processing program, checking function data in a function entry containing access data of the data processing program for compatibility by a data processing unit, and controlling access to the functional unit based upon the corresponding function data.

In accordance with still another mode, the method of the invention includes having the data processing unit execute at least one step of generating an error message and terminating program execution if a data processing program is not compatible with a functional unit.

In accordance with still a further mode, the method of the invention includes the steps of checking collective function entry to determine whether necessary properties are available and the functional unit is compatible; initializing the compatible functional unit for access by the data processing unit controlled by the data processing program; attaining access by activating the compatible properties of the functional unit; checking the compatibility of the parameters of the optional and available function data in the function register with the configuring access data of the data processing program; initializing the compatible, optional and available function data; and attaining access by activating the optional and available properties.

In accordance with a concomitant mode, the method of the invention includes performing the initialization by configuring the compatible functional unit based upon the function data from the function register; checking as to whether all the function data required for execution of the data processing program are present; checking the compatibility of the function data with the access data of the processing program; and configuring the compatible function data.

A way of achieving the objective of the invention is provided by the fact that the memory has at least one function entry containing function data associated with the physical properties of the functional unit, and that a change in the properties of the functional unit can be recorded by changing the corresponding function data in the function entry in the function register.

An advantage of the device is that the physical properties of a functional unit are provided in the associated function register and can be requested. The physical properties include the values for voltage, current and resistance for the input and output of the functional unit, and also interface parameters such as signal characteristics, transfer protocols and rates and the like.

The function data are allocated by storing them in structured form in a function entry in the function register. In this context, they have a prescribed format, for example, parameters, parameter fields or strings, and the like. In this case, the function entry contains the prescribed function data.

A change in or extension of the property of a functional unit is recorded in the function register by changing the function data in the function entry accordingly. Thus, when the function entry has been changed, a data processing program which has not been updated during this change remains capable of recognizing the unmodified and compatible properties of the functional unit, because they are still present in the function entry in unmodified form. The new modified properties are recognized only by the new data processing programs which are compatible with these properties and request these properties.

According to the invention, a new functional unit is installed in the electrical system with the function register, or the function register is configured based upon the properties after installation. The properties are, respectively, represented by the function entry in the function register. When the function entry is checked by an old data processing program, the new function data, for which the program has no use, are ignored, and hence the corresponding properties are not recognized. Only the function entries which are required for operation and are compatible with this program are recognized. It is thus possible to operate the new functional unit with the properties which are necessary for this old data processing program.

New data processing programs recognize not only the old properties but also the new properties and involve the functional unit in operation based upon the properties thereof. Assurance is thereby provided, advantageously, that the functional unit can be operated with new and old data processing programs without having to update the data processing programs which are required for operation if the functional unit needs to have the properties thereof changed or needs to be extended by new properties, or else if the old functional unit needs to be replaced with a new functional unit.

Even if two functional units access one another directly, which happens, in particular, in the case of functional units with a dedicated CPU, data communication can be controlled using the prescribed function entries in the respective function registers.

One particularly advantageous refinement of the invention is provided in that each function entry in the function register can preferably be modified by erasing, overwriting and/or adding to individual function data and/or groups of function data. This refinement permits a modification to individual properties of the functional unit in the function entry to be taken into account separately. In this context, only the function data which represent the change in the properties are modified. In addition, a property which is to be removed completely can be removed from the function register by overwriting the function data in the appropriate function entry with a zero value. If the property is being replaced by another property, it is also possible to express this by referring to a new function entry in the function register, the original function entry being changed by the reference itself. To this end, a plurality of function entries are also provided in a function register.

The system can thus always be operated with previously existing data processing programs or functional units. Compatibility is retained with each change, and the properties continue to be recognizable.

In another embodiment of the device, data processing programs for operating a functional unit have access data corresponding to the function data. When the CPU, which is controlled by a data processing program, accesses a functional unit during operation of the system, the function data in the function entries are first checked to determine whether the properties required for access are available in the functional unit. To this end, it is necessary for there to be corresponding access data of the data processing programs, with which the function entries in a function register are checked and, if the properties are available, initialized by the CPU.

Another refinement of the device is provided in that function registers of various functional units in the electrical system are preferably connected to one another via the CPU, and the compatibility of a functional unit with another functional unit and/or with a data processing program can be checked by comparing the corresponding function data and/or access data. Particularly if functional units of various hardware components access one another via the CPU or directly, or if data are to be interchanged, it is advantageous that the function registers are appropriately linked to one another. This is ensured by a network or by a CPU which connects the function registers, so that, when a functional unit is accessed, the associated memory thereof containing the function entries is available to the CPU. Advantageously, the CPU is connected indirectly or directly to the function registers for this purpose. In this context, the CPU can compare the function data and can regulate access to, operation of, or data interchange with the functional units, accordingly.

In addition, a preferred refinement of the invention is provided by the function register having a collective function entry which has associated function data for properties of the functional unit for which there is no association in the function entries. If a functional unit in the electrical system has properties which are not allocated in a function entry in the standard manner and thus lack appropriate function data in the function entries, for example, in the case of a functional unit change which is relevant for the data processing programs, it is advantageous to store these function data in the collective function entry. Advantageously, it becomes possible for the data processing program to check the corresponding properties without requiring a modification of the data structure of the existing function entries.

In addition, in another refinement of the invention, the function register is provided with at least one mechanically operated and/or electronic read/write memory, preferably a DIP switch, a solder bridge, a jumper or a memory chip, for storing the function data. Advantageously, the function entries can be produced and coded by using mechanically operated, preferably electronic memory units. In particular, switches and the like are suitable therefor. In addition, electronic memories can be used, which can easily be incorporated into the electrical system and are likewise easy to network. The use of electronic memory chips is associated with considerable cost benefits.

Another refinement of the device according to the invention is provided by having the electrical system comprise functional units in a module of a printing machine, preferably input/output units, actuators, interfaces and/or memory and data processing units of a driving motor. In this context, provision is made for each module to be equipped with an EEPROM as function register containing the function data for all involved components of the module. Preferably, the function data for the motor, tachometer, brake and fan are assigned to memory addresses and are available to the CPU in readable form.

In another mode of the method for recognizing a functional unit using the device according to the invention, provision is made for each property of the functional unit to be stored in the read/write memory of the function register by a function entry and/or collective function entry associated with the respective property, and for a function entry to be changed by replacing, adding to and/or erasing individual function data or a group of function data or the entire function entry in the read/write memory. Advantageously, during operation of the system, control of the functional units which are involved can be improved by checking the function register, because the properties which are required for accessing the respective functional unit can first be checked using the function entry or collective function entry provided for this purpose. In this context, a check is first provided which establishes whether the necessary property for accessing the functional unit is present. This means that there is a check both for the existence of the hardware component and for the appropriate circuit prerequisites, which, by way of example, comprise the transfer rate, the input and output and the drive signals. The compatibility of the functional unit with other components in the electrical system can thus advantageously be recognized, and the necessary initialization operations of the signals for matching access can be made dependent exclusively upon the function entries in the function register. The control of access operations to a functional unit using version compatibility lists in the software or files provided for this purpose is therefore no longer necessary. Hence, fundamentally time-consuming updating operations are dispensed with for replacing or modifying or for maintaining the system, because the modifications to functional units can be recognized in the function registers thereof for the entire system.

One refinement of this method is achieved by the fact that, during operation of the electronic system with a data processing program, the function data in the function entry containing the access data of the data processing program are checked for compatibility by the CPU, and that access to the functional unit is controlled based upon the corresponding function data. In this context, provision is made for the CPU to generate an error message and/or to terminate program execution if a data processing program is not compatible with a functional unit. This advantageously prevents incompatibilities in the functional units or in the data processing programs from causing malfunctions in the functional units, and hence errors in the operation of the installation. Provision is also made for the error message to be output to other functional units or to the data processing programs managing the system, so that any correction can be made in automated fashion.

One particularly preferred refinement of the invention is provided by a method having the following steps, namely, the collective function entry is checked to determine whether the necessary properties are available and the functional unit is compatible; the compatible functional unit is initialized for access by the CPU controlled by the data processing program; access is attained by activating the compatible properties of the functional unit; the compatibility of the parameters of the optional and available function data in the function register with the configuring access data of the data processing program is checked; the compatible, optional and available function data are initialized; access is attained by activating the optional and available properties.

In this case, provision is made for initialization to be performed by the following steps: the compatible functional unit is configured, based upon the function data from the function register; a check is performed to determine whether all the function data required for execution of the data processing program are present; the compatibility of the function data with the access data of the data processing program is checked; the compatible function data are configured.

Each software-relevant change to a property of the functional units, i.e., of a hardware component, is represented in the function register by a change in the associated function entry. In order not to modify the compatibility of data processing programs with the functional unit in terms of the unmodified properties, the function data in the associated function entry are retained. A data processing program accessing this functional unit checks the minimum requirements for the properties available in the functional unit, i.e., the necessary functions. If not all of these necessary functions are provided by the functional unit, it is necessary to ensure that the data processing program is stopped in order to prevent malfunctions. Furthermore, a data processing program can use other nonessential properties (optional functions) of a functional unit, provided that they are available in the function register.

Due to the limited nature of the memory space in the memory chips used for the function registers, for example EEPROM memory chips, a system of data organization is provided. This is achieved by subdividing the memory addresses of the function registers into main groups containing free memory addresses and into subgroups containing used memory addresses. The arrangement or sequence of the parameters in a memory address of a subgroup is predetermined and cannot be modified. The superordinate main groups can be used as desired in this case. Chaotic arrangement of the data is prevented by virtue of the fact that the subgroups are allocated data of the same type, such as physical parameters. The sequence of the parameters is then as defined for the subgroup and as added to over the course of time. Each subgroup has an associated function entry in the form of a value which indicates which parameters are present in the prescribed sequence. In one preferred refinement, each subgroup can have exactly one parameter assigned thereto, which means that each parameter then has one associated value. This permits any desired downward-compatible change in the parameter arrangement.

Any change in the functional unit is indicated by extending the respective function entry of the CPU, and is thus indicated to the electrical system. When the function data in a function entry are extended, the old data records of the function data in this subgroup are retained, which means that they are still valid for the previously compatible data processing programs. A change in the functional unit can be indicated to the electrical system by a new function entry in the function register. In this context, the originally allocated function entry can be erased or rendered invalid. In the collective function entry, the validity of particular function entries for the data processing programs is stipulated. In addition, provision is made for individual function data in a function entry to be blocked for particular access operations by an entry in the collective function entry, and thus to be rendered invalid for particular data processing programs. Advantageously, each functional unit, i.e., the hardware component in an electrical system, such as a regulatable motor in a printing machine, is thus provided with a multifunction switch which permits the data processing programs to drive and activate the individual properties of this functional unit, with the necessary parameters for access being provided at the same time. Later extensions or other changes to the functional unit which have no effect upon the required properties of the data processing program, and the corresponding function data in the function entries, do not adversely affect access and activation of the respective property of the functional unit by this data processing program.

Other features which are considered as characteristic for the invention are set forth in the appended claims.

Although the invention is illustrated and described herein as embodied in a device and method for recognizing functional units, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, wherein:

BRIEF DESCRIPTION OF THE DRAWINGS

FIG. 1 is a function sketch or block diagram of the device for recognizing a function unit in accordance with the invention;

FIG. 2 is an example of address occupancy of a function register by function data;

FIG. 3 is a flow chart for checking a function register at the start of the software program after turn-on; and FIG. 4 shows the occupancy of the function data in a collective function entry.

DESCRIPTION OF THE PREFERRED EMBODIMENTS

Figure 3:
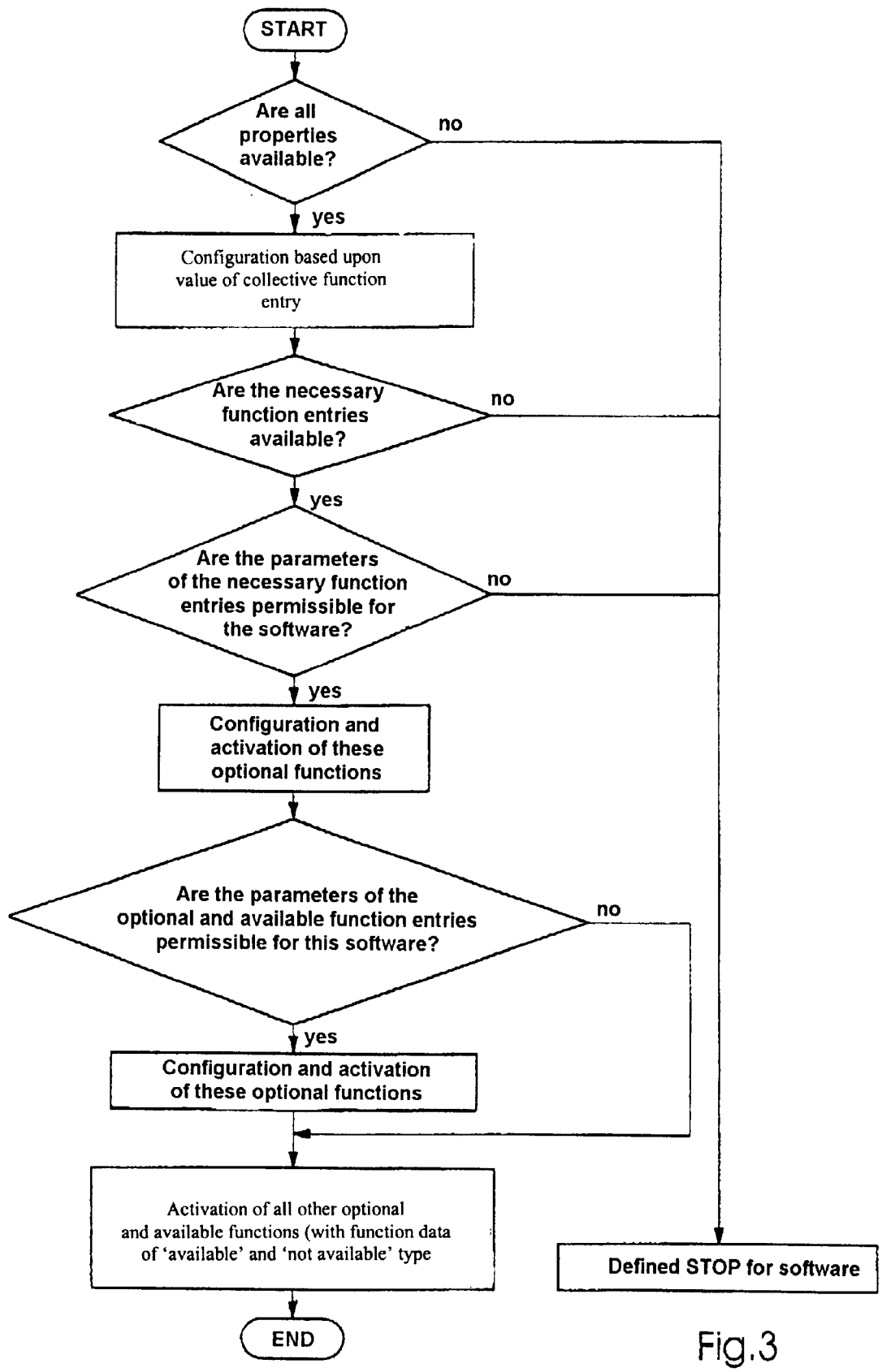

Referring now to the drawings and, first, particularly to FIG. 1, thereof, there is shown therein a function sketch or block diagram of a device 1, which includes a functional unit 2 and a data processing unit or CPU 3. The functional unit 2 has a function register 4 containing function entries, respectively, provided for storing the properties associated with function data.

The CPU 3 is connected to the function register 4 and to the functional unit 2, and also to further functional units 2. In addition, the CPU 3 includes data processing programs for controlling and regulating the electrical system with which the device 1 is associated.

If the electrical system accesses a functional unit 2, the CPU 3 sends a function enquiry to the function register 4 in the functional unit 2 and receives a response based upon the function data in the function entries. The CPU 3 uses these function data to calculate the function availability, i.e., the functional scope and the compatibility of the functional unit 2, based upon a prescribed algorithm known in the prior art. If the functional scope and the compatibility exist, the access and/or data interchange can take place.

If there is no functional scope or compatibility, the CPU 3 generates an error message to an input/output unit 6 of the system, or execution of the data processing program is stopped. If a functional unit 2 in the system wishes to access another functional unit 2, the error message can also be output to this functional unit directly.

FIG. 2 explains a typical memory use in the function register using the example of an EEPROM memory chip. The instant the functional scope of a functional unit is changed or extended, the function register has further function data allocated thereto without any modification of the originally existing allocations. This is achieved by the function data being coded by a prescribed algorithm which is known in the state of the prior art, and being allocated to a new function entry. Provision is made for the function data in the function entry in the function register to be stored in the form of a data segment, preferably as a byte, which is readable by the CPU. The number of all the function entries is transmitted to the CPU in a format taking the form of an integer word or hexadecimal word. These function entries can be used for comparison with access data stored in the data processing programs and/or functional units. Advantageously, the function entries can be compared with access data of the data processing programs and/or functional units without further decoding, so that the computation time is kept down and the operation can be performed efficiently. The loading on the CPU is therefore kept down even with a large number of access operations.

In the example, the function registers are subdivided into main groups and subgroups which have appropriate group numbers allocated thereto. The main group numbers stipulate the specification for all the data in the function register. This specification represents particular functional units. In the aforecited example, the values 1024, 1026, 1028 and 1030 are allocated to various printing machine motors. The values 512, 514 and 516 are allocated to signal generators, the value 640 is allocated to a temperature sensor and the value 768 is allocated to a brake in a printing machine. Hence, the scope for interpretation of the data is fixed.

In order to prevent a chaotic arrangement, the parameters are divided into subgroups. The subgroup numbers are used to classify the parameters. The subgroup numbers are preferably the same for each main group. In the example at hand, the subgroup number with the value 1 is allocated to the physical parameters, preferably to measured values for resistances R, inductance L and capacitance C in an electronic circuit on the rotor and stator, respectively, of a printing machine, to the moment of inertia of the rotor $J_{Rotor}$ or for the temperature $T_{Rotor}$.

The subgroup number with the value 2 is allocated to rated values or description data, for example to the current I, the voltage U, mean values, rms values, slip frequency, pole number, magnetization current, direction of rotation of the motor, of the tachometer, of the brake or of the fan, of the moment of the motor or brake, tacho line count or the number of traces in the case of a digital tachometer, the voltage proportionality factor on an analog tachometer, resolver frequency, resolver offset and resolver transformation ratio and also resolver pole number, the supply voltage and supply current, respectively, for transmitter and brake, the volume and the pressure of the fan, the gear transmission ratio or the gear moment, and the like. Preferably, the function register in an EEPROM memory chip can record function data which contain information about the memory organization or the coding of the function entry and of the function data and also formats such as main group structure and subgroup structure.

The subgroup number with the value 3 indicates the maximum ratings for the installation. These are, in particular, maximum ratings for pulsed currents with pulsed current times, demagnetization, continuous operation, intermittent operation, mechanical maximum rotational speed, temperature warning and disconnection limits of the temperature sensor, thermal motor protection, disconnection resistance, and the like.

The subgroup number with the value 4 indicates standard parameters for current regulation. These are, in particular, rotor time constant Ta, transfer factor Ka, start of saturation, end of saturation, minimum stator inductance, rotor leakage inductance, and the like.

The subgroup number with the value 5 indicates the coupled regulating parameters, preferably P term, I term, gap size 50/60 Hz, configurable armature resistance including brush voltage/I rated, and the like.

The subgroup number with the value 6 indicates the mechanical data, preferably, mass, isolation class, shaft height, shaft diameter, length, mounting, physical size, physical shape, connection, connectors, eyes, terminal box position.

The subgroup number with the value 7 indicates the administrative data, preferably manufacturer number, manufacturer identification, type identification, serial number including the serial numbers of the sensor, the brake, the connector and the like.

The physical units are preferably indicated in standardized units, namely meter, kilogram, second, ampere, volt, watt and combinations thereof.

Each parameter is accorded its scope of interpretation only by the subgroup wherein it is specified as, by way of example, rated or min/max value. Because the main group number identifies the component type, the data fields in a subgroup for parameter classification are used exclusively in connection with such a subgroup and are evaluated with the main group number.

Finally, the data type and possibly the exponent for integer types of the parameter are coded with one byte. For data type and exponent, particular control bits are provided, so that the format can be changed with backward compatibility.

For all memory addresses, a dummy code is provided, which has the value "00 H" in the example. The function data are stored based upon the "little endian" method, wherein the "least significant byte" is arranged at the lowest memory address, and the "most significant byte" is arranged at the highest memory address. An exception in this context is the CRC checksum, which is appended to the end of a data segment—"big endian".

The group numbers of the main groups and subgroups are stipulated and are not modified again. The formats of the function data are coded for each individual parameter using the control byte, in order to increase the flexibility. To indicate which memory area is used, the length of the entire data field is placed at the beginning of the memory. A checksum is calculated by byte addition. To ensure data protection, a CRC checkword is appended at the end of the data field. In addition, the number of bytes in all the main groups and subgroups is placed at the start of the main group segments and subgroup segments. This allows very rapid calculation of pointers referring to the next main group or subgroup.

The total number of bytes in the main groups and subgroups includes all the bytes of the parameter fields plus two bytes for the number word itself and also another two bytes for the main group number and subgroup number, respectively. The unused remainder of the memory area is taken up by filler bytes "00 H".

To ensure data protection, a CRC checksum is appended at the end of the complete data block. CRC means "cyclic redundancy check" and is a known checking method wherein the division remainder of a modulo 2 arithmetic operation of a cyclic code is used as checkword.

FIG. 3 shows a typical flowchart implemented by the CPU when the function register is checked during a check for compatibility. In the case of this access, a check is first carried out in the collective function entry to determine whether all the physical properties used by this data processing program are also available in the functional unit. If this is not the case, the data processing program is terminated. In this context, an error message can be output beforehand to a display device.

If all the properties are available, access to the functional unit is configured based upon the collective function entry. The function entry in the function register is then checked to determine whether the properties for access to the functional unit (necessary functions) are available. If this is not the case, the program is terminated. If it is the case, a check is carried out to determine whether the parameters of the function data are permissible for access by the data processing program and, if appropriate, the function data are configured as necessary. Otherwise, the program is terminated. Finally, the parameters of the optional properties which have been established as being available are checked to determine whether they are permissible for access by the data processing program. If appropriate, the optional properties are configured and activated. Otherwise, only the necessary characteristics are activated.

FIG. 4 shows an example of a collective function entry. In the collective function entry, all the properties of the functional unit EWM3 have associated function data which have been modified in comparison with the functional unit EWM2 and cannot be ascertained by the old data processing programs of EWM2. These properties are missing in the corresponding function entry held in the function register of EWM3. The standard length of the entry is eight bits. The first bit "0" is switched either to "0" or to "1". In the example at hand, it indicates whether the functional unit EWM3 is compatible with the functional unit EWM2. The value "0" indicates that the functional unit is compatible. If this is the case, EWM3 can replace EWM2 as a replacement part, without any need for modifying the data processing programs which access it. The function data required for access by the data processing programs of EWM2 are indicated in the function entry in the function register, which is otherwise not shown here.

We claim:

1. A device for recognizing functional units in an electrical system, which is one of being preferably optional and provided in different construction stages, respectively, comprising:

a data processing unit having a data processing program; and at least one functional unit, said functional unit having a function register with a nonvolatile memory for holding function data, said memory having at least one function entry with function data associated with the physical properties of the functional unit, a change in the properties of the functional unit being recordable by changing the corresponding function data of the function entry in the function register;

the data processing program checking the at least one function entry and the function data not used by the data processing program remaining unconsidered.

2. The device according to claim 1, wherein each function entry in the function register is changeable by at least one step of erasing, overwriting and adding to, respectively, at least an individual set of function data.

3. The device according to claim 1, wherein the data processing program for operating the functional unit has access data corresponding to the function data.

4. The device according to claim 1, wherein function registers of various functional units in the electrical system are connected to one another via the data processing unit, and compatibility of a functional unit with at least one of another functional unit and a data processing program, respectively, is checkable by comparing at least one set of the corresponding function data and access data.

5. The device according to claim 1, wherein the function register has a collective function entry with which function data for properties of the functional unit are associated for which there is no association in the function entries.

6. The device according to claim 1, wherein the function register has at least one mechanically operated and electronic, respectively, read/write memory for storing the function data.

7. The device according to claim 6, wherein said memory is selected from the group consisting of a DIP switch, a solder bridge, a jumper and an electronic memory chip.

8. The device according to claim 1, wherein the electrical system includes functional units in a module of a printing machine.

9. The device according to claim 8, wherein the functional units in the module of the printing machine include a plurality of units selected from the group consisting of input/output units, actuators, interfaces as well as memory and data processing units of a driving motor.

10. A method for recognizing a function unit in an electrical system, which is one of being optional and provided in different construction stages, respectively, which comprises:

storing each property of the functional unit in a read/write memory by at least one of a function entry and a collective function entry associated with the respective property;

changing the function entry by at least one of replacing, adding to, and erasing at least an individual function data or a group of function data or the entire function entry in the read/write memory;

checking the at least one function entry by a data processing program and the function data not being used by the data processing program remaining unconsidered; and recognizing the unchanged and compatible properties of the function unit by said data processing program.

11. The method for recognizing a functional unit according to claim 10, which includes the steps of checking collective function entry to determine whether necessary properties are available and the functional unit is compatible; initializing the compatible functional unit for access by the data processing unit controlled by the data processing program; attaining access by activating the compatible properties of the functional unit; checking the compatibility of the parameters of the optional and available function data in the function register with the configuring access data of the data processing program; initializing the compatible, optional and available function data; and attaining access by activating the optional and available properties.

12. The method for recognizing a functional unit according to claim 11, which includes performing the initialization by configuring the compatible functional unit based upon the function data from the function register; checking as to whether all the function data required for execution of the data processing program are present; checking the compatibility of the function data with the access data of the processing program; and configuring the compatible function data.

* * * * *